United States Patent
Bowen et al.

(10) Patent No.: US 6,604,591 B2
(45) Date of Patent: *Aug. 12, 2003

(54) ELECTRIC DRIVE MOTOR AXLE WITH INTEGRATED REDUCTION AND DIFFERENTIAL GEARSET

(75) Inventors: Thomas C. Bowen, Rochester Hills, MI (US); Philip J. Frances, Lapeer, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/262,707

(22) Filed: Oct. 2, 2002

(65) Prior Publication Data

US 2003/0037976 A1 Feb. 27, 2003

Related U.S. Application Data

(63) Continuation of application No. 09/808,579, filed on Mar. 14, 2001, now Pat. No. 6,484,834.

(51) Int. Cl.$^7$ ............................................. B60K 17/06
(52) U.S. Cl. ..................... 180/65.6; 180/65.2; 475/205; 475/204
(58) Field of Search ............................... 180/65.2, 65.6, 180/65.3, 65.4, 65.5, 65.1; 475/5, 204, 205, 149, 150, 221, 342, 248; 74/409, 410

(56) References Cited

U.S. PATENT DOCUMENTS

| | | | |
|---|---|---|---|
| 4,283,968 A | 8/1981 | Kans | |
| 4,357,840 A | 11/1982 | Winzeler | |
| 4,763,749 A | 8/1988 | Mura et al. | |
| 5,059,163 A | 10/1991 | von Greyerz | |
| 5,513,719 A | 5/1996 | Moroto et al. | |
| 5,558,589 A | * 9/1996 | Schmidt | 475/5 |
| 5,868,641 A | 2/1999 | Bender et al. | |
| 5,919,109 A | * 7/1999 | Fleckenstein | 475/151 |
| 5,943,918 A | 8/1999 | Reed, Jr. et al. | |
| 5,947,855 A | 9/1999 | Weiss | |
| 6,019,698 A | 2/2000 | Lawrie et al. | |
| 6,041,877 A | 3/2000 | Yamada et al. | |
| 6,053,833 A | 4/2000 | Masaki | |
| 6,059,684 A | 5/2000 | Susuki et al. | |
| 6,083,138 A | 7/2000 | Aoyama et al. | |
| 6,170,587 B1 | 1/2001 | Bullock | |
| 6,234,930 B1 | 5/2001 | Kaneko | |
| 6,248,036 B1 | 6/2001 | Masaki | |
| 6,378,638 B1 | * 4/2002 | Mizon et al. | 180/65.6 |
| 6,383,114 B1 | 5/2002 | Hoshiya et al. | |
| 6,401,850 B1 | * 6/2002 | Bowen | 180/65.6 |
| 6,402,654 B1 | 6/2002 | Lanzon et al. | |
| 6,481,519 B1 | * 11/2002 | Bowen | 180/65.6 |
| 6,484,834 B2 | * 11/2002 | Bowen et al. | 180/65.6 |
| 6,499,549 B2 | * 12/2002 | Mizon et al. | 180/65.6 |

* cited by examiner

Primary Examiner—Brian L. Johnson
Assistant Examiner—J. Allen Shriver
(74) Attorney, Agent, or Firm—Harness, Dickey & Pierce P.L.C.

(57) ABSTRACT

A drive axle adapted for use in hybrid vehicles and having an electric motor and a gearbox packaged within a common housing assembly. The gearbox includes a differential assembly driven by a planetary-type reduction unit. The reduction unit includes a first planetary gearset having a first sun gear driven by the motor, a first ring gear, and a set of first planet gears meshed with the first sun gear and the first ring gear. A first planet carrier is non-rotatably fixed to a stationary number and rotatably supports the first planet gears. A second planet gearset includes a second sun gear fixed for rotation with the first ring gear, a second ring gear non-rotatably fixed to the stationary member, and a set of second planet gears rotatably supported from a second planet carrier and which mesh with the second sun gear and the second ring gear.

27 Claims, 8 Drawing Sheets

ELECTRIC DRIVE MOTOR AXLE WITH INTEGRATED REDUCTION AND DIFFERENTIAL GEARSET

CROSS REFERENCE TO RELATED APPLICATION

This application is a continuation of prior application Ser. No. 09/808,579 filed Mar. 14, 2001 entitled "ELECTRIC DRIVE MOTOR AXLE WITH INTEGRATED REDUCTION AND DIFFERENTIAL GEARSET", now U.S. Pat. No. 6,484,834 which application is herein expressly incorporated by reference.

FIELD OF THE INVENTION

The present invention relates to hybrid drive systems for motor vehicles. More specifically, the present invention relates to an integrated electric motor and axle assembly for use in hybrid motor vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop hybrid powertrains for use in four-wheel drive vehicles that utilize many conventional powertrain components so as to minimize specialized packaging and reduce cost.

SUMMARY OF THE INVENTION

It is an object of the present invention to provide a hybrid powertrain of drive system for a four-wheel drive vehicle.

It is another object of the present invention to provide an integrated gearbox and electric motor assembly for use as an electric drive motor axle in a hybrid vehicle.

As a related object, the hybrid drive system of the present invention utilizes an internal combustion engine as a first drive source to supply motive power to a first set of wheels and further uses the electric drive motor axle as a second drive source to supply motive power to a second set of wheels. A control system functions to control operation of the first and second drive sources either independently or in combination as dictated by the current vehicle operating conditions.

These and other objects are provided by drive axle adapted for use in hybrid vehicles and having an electric motor and a gearbox packaged within a common housing assembly. The gearbox includes a differential assembly driven by a planetary-type reduction unit. The reduction unit includes a first planetary gearset having a first sun gear driven by the motor, a first ring gear, and a set of first planet gears meshed with the first sun gear and the first ring gear. A first planet carrier is non-rotatably fixed to a stationary number and rotatably supports the first planet gears. A second planet gearset includes a second sun gear fixed for rotation with the first ring gear, a second ring gear non-rotatably fixed to the stationary member, and a set of second planet gears rotatably supported from a second planet carrier and which mesh with the second sun gear and the second ring gear.

In accordance with one aspect of the present invention, the differential assembly is a planetary gearset having a third ring gear fixed for rotation with a first output shaft, a third sun gear fixed for rotation with a second output shaft, and a set of third planet gears rotatably supported from the second planet carrier and which mesh with the third sun gear and the third ring gear.

In accordance with another aspect of the present invention, the differential assembly is a planetary gearset having a third sun gear fixed for rotation with a first output shaft, a third ring gear fixed for rotation with the second planet carrier, a third planet carrier fixed for rotation with a second output shaft, a set of third planet gears rotatably supported by the third planet carrier and meshed with the third ring gear, and a set of fourth planet gears rotatably supported by the third planet carrier and meshed with the third sun gear and the third planet gears.

Further areas of applicability of the present invention will become apparent from the detailed description provided hereinafter. However, it should be understood that the detailed description and specific examples, while indicating preferred embodiments of the present invention, are intended for purposes of illustration only since various changes and modifications within the fair scope of this particular invention will become apparent to those skilled in the art.

DETAILED DESCRIPTION OF THE PREFERRED EMBODIMENTS

The present invention is related to an integrated gearbox and electric motor asssembly, hereinafter referred to as an electric drive motor axle, which functions as an electrically-controlled transaxle in a hybrid motor vehicle for delivering motive power (i.e., drive torque) to a pair of ground-engaging wheels. The compact arrangement of the electric motor and gearbox in a common housing permits the use of the electric drive motor axle in substitution for a conventional axle assembly. As such, conventional rear-wheel drive and front-wheel drive powertrains can be used in combination with the electric drive motor axle so as to establish a hybrid drive system for a four-wheel drive motor vehicle. Accordingly, various features and functional characteristics of the electric drive motor axle will be set forth below in a manner permitting those skilled in relevant arts to fully comprehend and appreciate the significant advantages the present invention provides, particularly when used in four-wheel drive hybrid vehicles.

Figure 1:
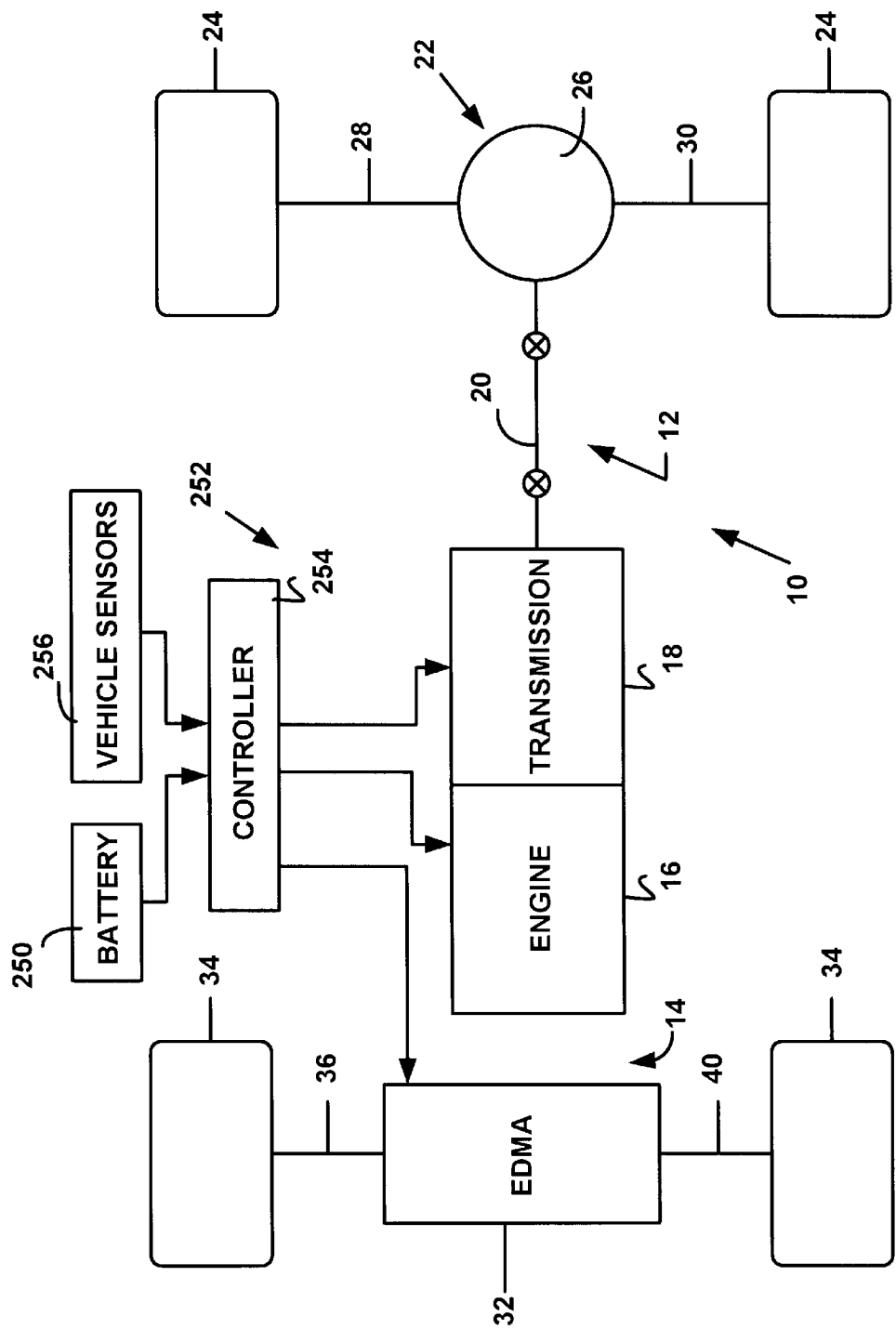
FIG. 1 is a schematic view showing a hybrid powertrain for a four-wheel drive vehicle in accordance with the present invention.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axleshafts 28 and 30 to wheels 24. Second powered driveline 14 includes an electric drive motor axle (EDMA) 32 which drives a second pair of wheels 34 through axleshafts 36 and 40.

Figure 2:
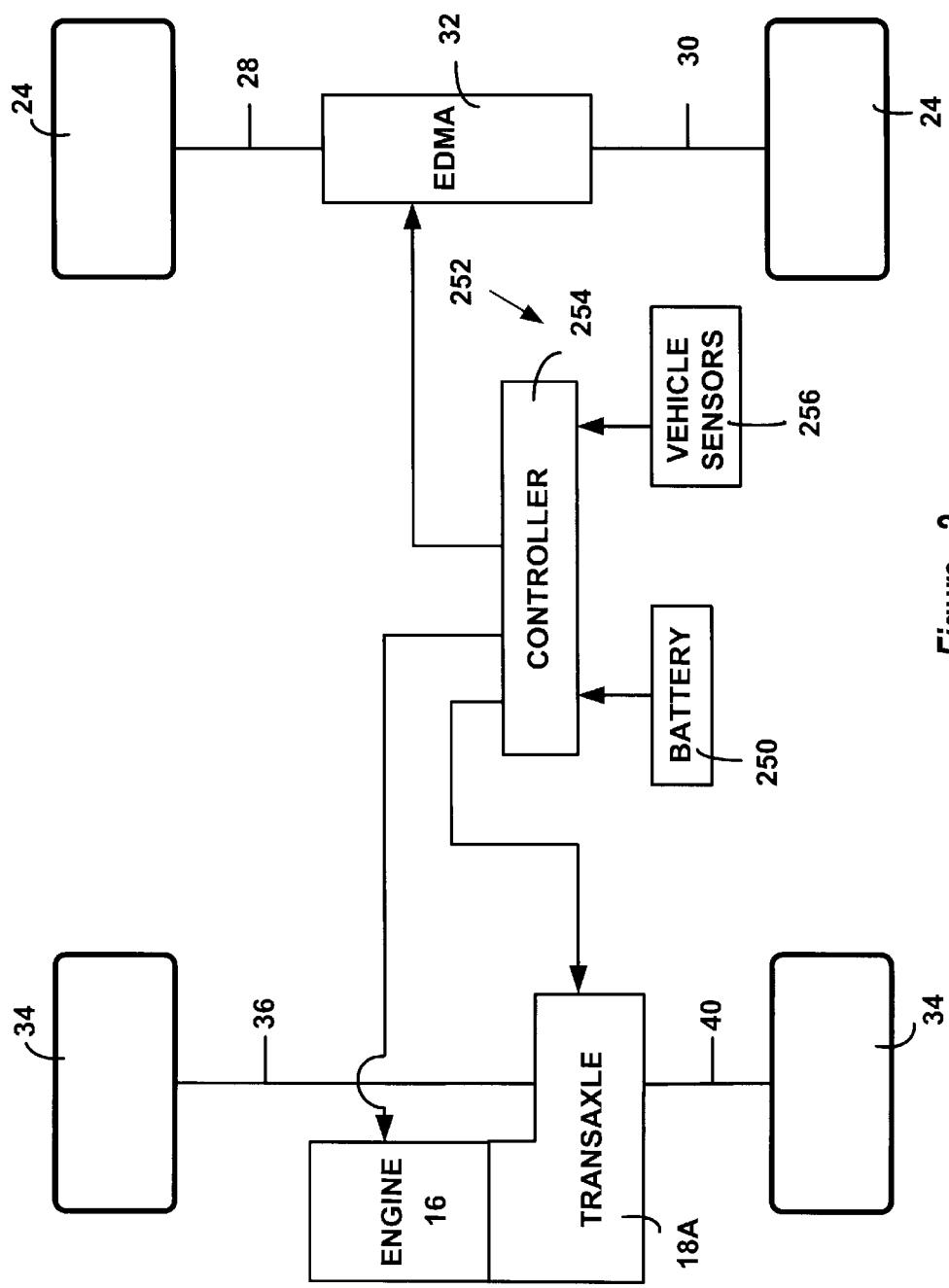
FIG. 2 is a schematic view of an alternative arrangement for the hybrid powertrain of the present invention.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that EDMA 32 supplies power to the rear wheels. To better illustrate this arrangment, FIG. 2 shows EDMA 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
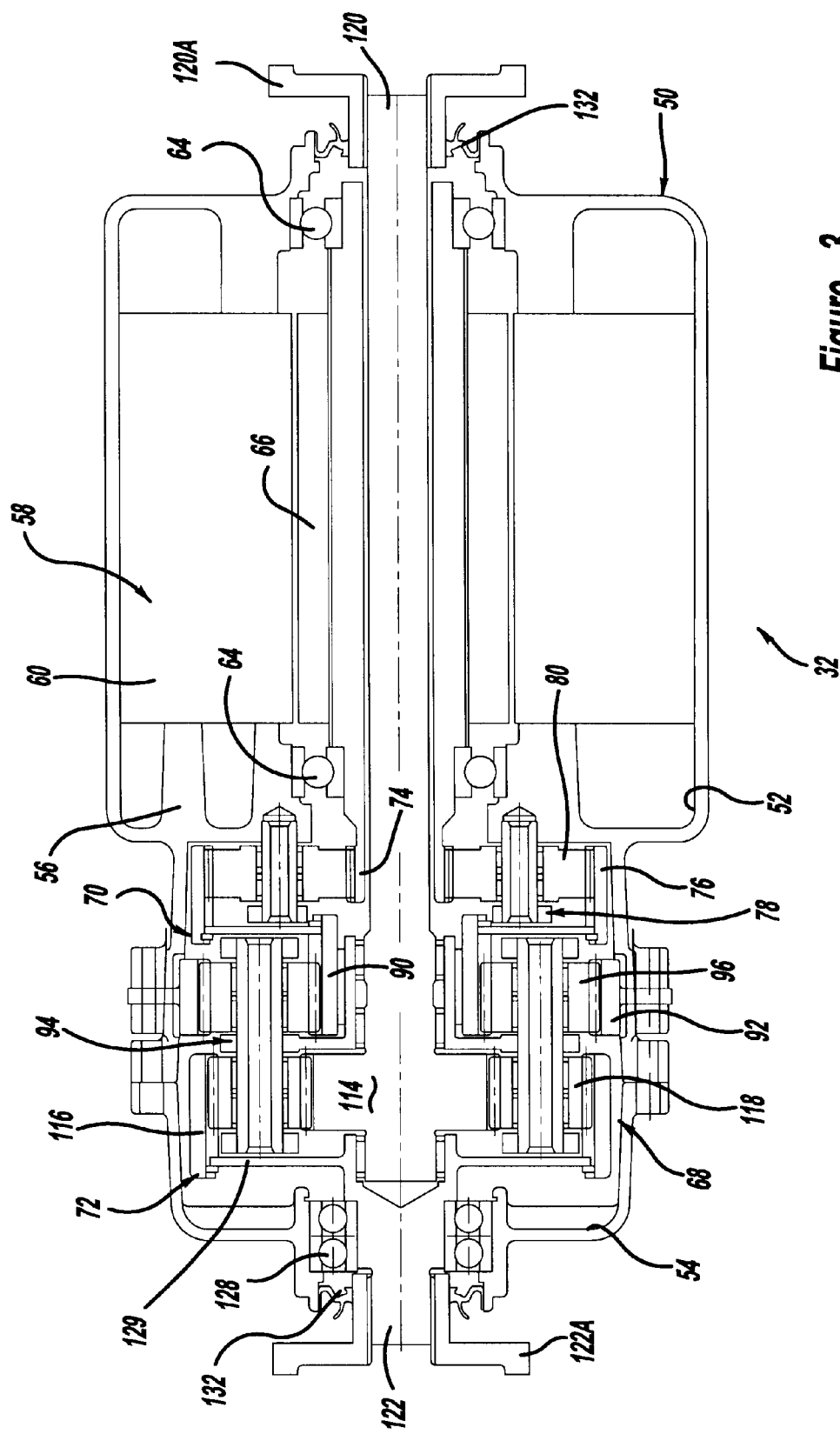
FIG. 3 is a sectional view of an electric drive motor axle associated with the hybrid powertrains of FIGS. 1 and 2.
Figure 4:
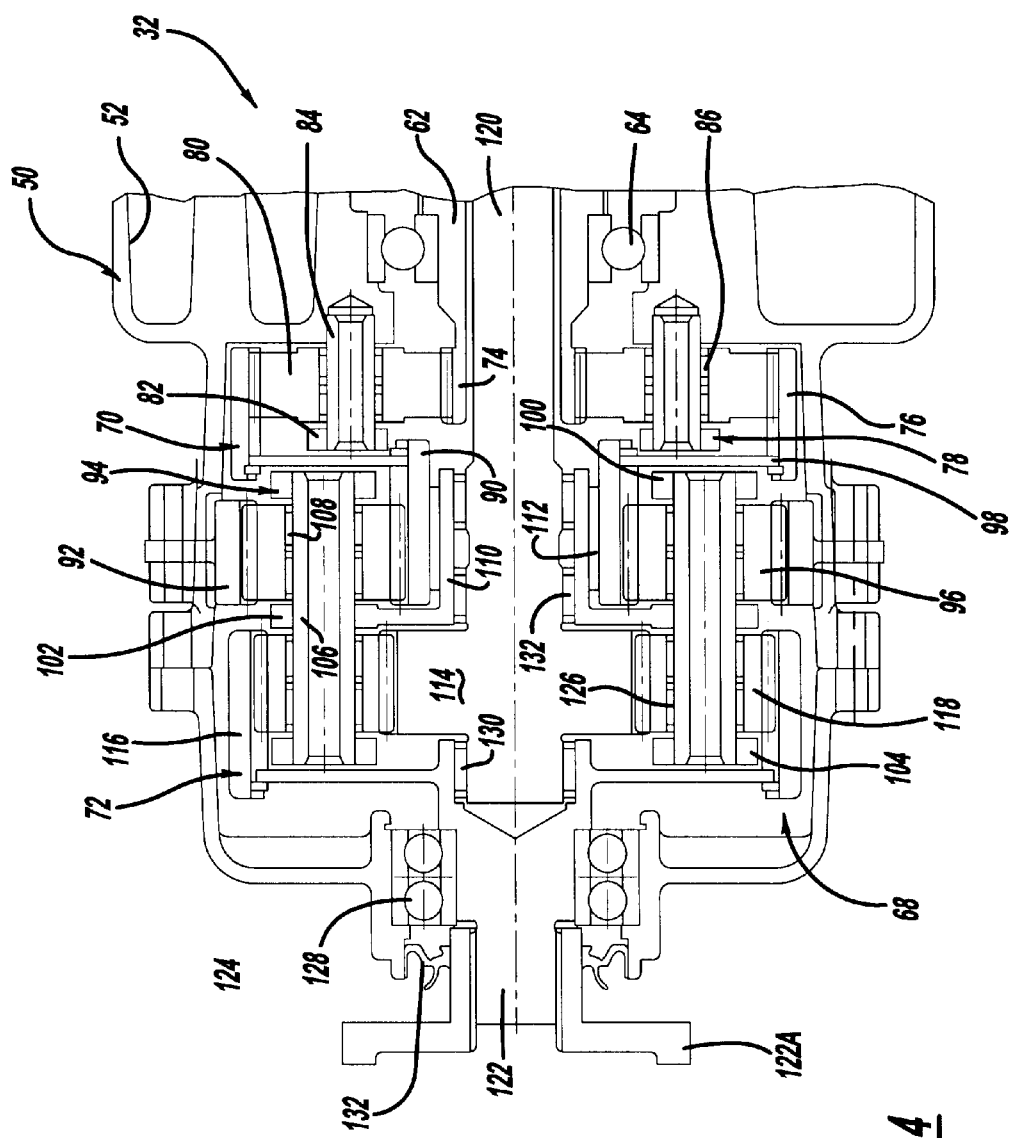
FIG. 4 is an enlarged portion of FIG. 3 showing the components associated with the gearbox of the electric drive motor axle in greater detail.

Referring now to FIGS. 3 and 4, a first preferred embodiment of EDMA 32 will be described in detail. EDMA 32 includes a multi-section housing assembly 50 defining a motor chamber 52 and a gearbox chamber 54 separated by a radial support wall 56. An electric variable speed motor assembly 58 is located within motor chamber 52 and includes a wound stator 60 secured to housing assembly 50 and a rotor 66 fixed for rotation with an elongated tubular rotor shaft 62. Rotor shaft 62 is supported at its opposite ends by bearing assemblies 64 for rotation relative to housing assembly 50.

EDMA 32 further includes a gearbox 68 located within gearbox chamber 54 and which is comprised of a reduction unit 70 and a differential assembly 72. Reduction unit 70 is comprised of a pair of planetary gearsets operably interconnected in series. In particular, a first planetary gearset includes a first sun gear 74, a first ring gear 76, a first planet carrier 78, and a set of first planet gears 80 meshed with first sun gear 74 and first ring gear 76. First sun gear 74 can be integrally formed at one end of rotor shaft 62 or, in the alternative, can be a tubular unit splined to rotor shaft 62. Planet carrier 78 is fixedly secured to housing assembly 50 and includes a carrier ring 82 and pins 84 rigidly secured to housing 50, such as by bolts (not shown). Planet gears 80 are rotatably supported by bearings 86 on pins 84. Since first planet carrier 78 is fixed against rotation, first planet gears 80 act as idler gears which share the loading and drive first ring gear 76 at a reduced speed relative to the rotary speed of first sun gear 74.

Reduction unit 70 further includes a second planetary gearset comprised of a second sun gear 90, a second ring gear 92, a second planet carrier 94, and a set of second planet gears 96 meshed with second sun gear 90 and second ring gear 92. Second sun gear 90 is fixed for rotation with first ring gear 76 via a drive plate 98. Second ring gear 92 is fixedly secured to housing assembly 50. Second planet carrier 94 includes a first carrier ring 100, a second carrier ring 102, and a third carrier ring 104 which are laterally spaced and interconnected by a plurality of pinion shafts 106. As seen, second planet gears 96 are rotatably supported by bearings 108 on pinion shafts 106 between first and second carrier rings 100 and 102. Second carrier ring 102 includes a tubular hub extension 110 on which a bushing 112 is mounted for supporting second sun gear 90 thereon.

With continued reference to FIGS. 3 and 4, differential assembly 72 is shown to include a third planetary gearset having a third sun gear 114, a third ring gear 116, and a set of third planet gears 118 that are meshed with third sun gear 114 and third ring gear 116. Third sun gear 114 is shown to be fixedly secured to one end of a first output shaft 120. Likewise, third ring gear 116 is shown to be coupled for rotation with one end of a second output shaft 122 via a second drive plate 124. Third planet gears 118 are rotatably supported by bearings 126 on pinion shafts 106 between second and third carrier rings 102 and 104. As shown, a bearing assembly 128 supports second output shaft 122 from housing assembly 50 while a pilot end of first output shaft 120 is supported by a bearing assembly 130 within a pilot aperture formed in second output shaft 122. Bearings 132 are also provided to rotatably support hub 110 of first carrier ring 102 on first output 120. Also, EDMA 32 includes end seals 132 which provide a fluid-tight seal between housing 50 and end sections of output shafts 120 and 122. In the particular construction shown, the end sections are yokes 120A and 122A adapted for connection to corresponding axleshafts. While not shown, it is contemplated that a lube pump is provided for circulating lubricant with gearbox chamber 54.

In accordance with a preferred use of EDMA 32, output shafts 120 and 122 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. First output shaft 120 is best shown in FIG. 3 to extend through tubular rotor shaft 62 such that rotor shaft 62 is journalled therein.

In operation, rotation of rotor shaft 62 via actuation of electric motor assembly 58 causes concurrent rotation of first sun gear 74. Since first planet carrier 78 is held stationary, rotation of first sun gear 74 causes first planet gears 80 to rotate and drive first ring gear 76 at a reduced speed. Such rotation of first ring gear 76 cause rotation of second sun gear 90 which, due to second ring gear 92 being held stationary, causes second planet carrier 94 to rotate at a further reduced speed. Obviously, the overall speed reduction ratio is established by the specific geometries of the meshing gears, but is preferred to be in the range of 10.0:1 to 15.0:1 for such hybrid motor vehicle applications. Since second planet carrier 94 acts as the driven output of planetary reduction unit 70, it drives third planet gears 118 of differential assembly 72 at a common rotary speed. Power is then transferred through third planet gears 118 and is ultimately delivered to output shafts 120 and 122. Variable speed control of motor assembly 58 permits the torque delivered to the wheels to be continuously controlled.

Figure 5:
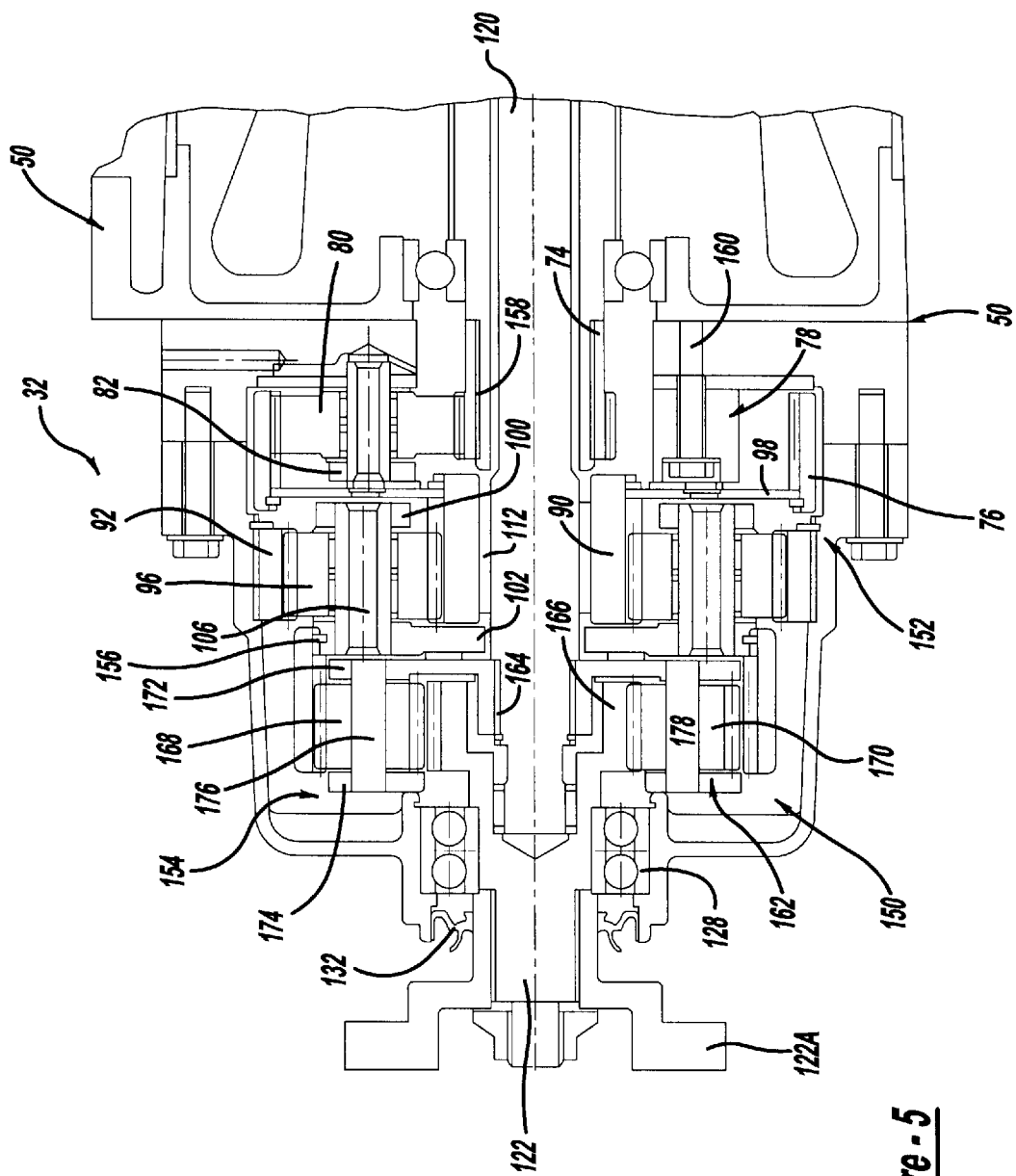
FIG. 5 is a partial sectional view showing an alternative embodiment of the gearbox adapted for use in the electric drive motor axle of the present invention.

Referring now to FIG. 5, a modified gearbox 150 for use in EDMA 32 in substitution for gearbox 68 is shown. Since many components of gearbox 150 are common to those of gearbox 68, like reference numerals will be used to identify parts having a similar function. In general, reduction unit 152 is similar to reduction unit 70 except that second planet carrier 94 now is arranged to drive third ring gear 116 of differential assembly 154 via a splined connection 156. First sun gear 74 is now shown to be fixed via a spline connection 158 to rotor shaft 62 and bolts 160 are shown for securing first carrier 80 to housing 50. Second sun gear 90 is also now shown to be supported by bushing 112 on first output shaft 120 since hub extension 110 of second carrier ring 102 has been eliminated.

Differential assembly 154 is planetary gearset having a third planet carrier 162 fixed via a spline connection 164 to first output shaft 120, a third sun gear 166 fixed to second output shaft 122, and meshed pairs of third planet gears 168 and fourth planet gears 170. Third planet carrier 162 includes an inner ring 172 connected to an outer ring 174 and pinion shafts 176 and 178 that extend between rings 172 and 174. In particular, third planet gears 168 are rotatably supported on pinion shafts 176 and are radially positioned to mesh with third ring gear 116 but not with third sun gear 166. Likewise, fourth planet gears 170 are rotatably supported on pinion shafts 178 and are radially positioned to mesh with third sun gear 166 but not with third ring gear 116. As noted, the planet gears are arranged as meshed pairs for establishing an indirect meshing between third ring gear 116 and third sun gear 166. Thus, power delivered to third ring gear 116 from reduction unit 152 is delivered at a predetermined torque distribution ratio between output shafts 120 and 122.

Figure 6:
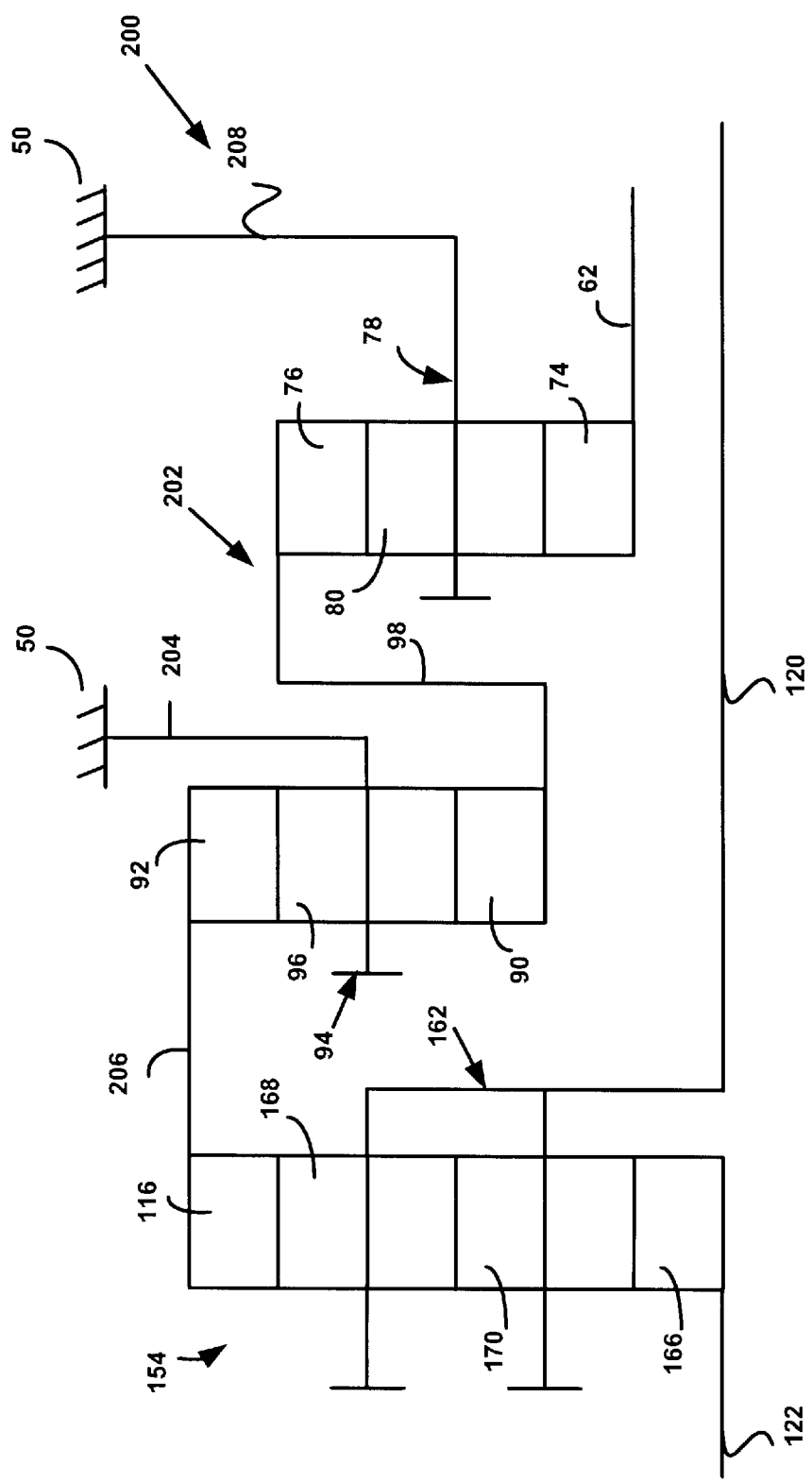
FIG. 6 is a schematic of another alternative embodiment for a gearbox adapted for use in the electric drive motor axle of the present invention.

Referring now to FIG. 6, a schematic illustration is provided for another alternative construction for a gearbox 200 adapted for use in EDMA 32. Gearbox 200 includes a modified reduction unit 202 which drive differential assembly 154 of FIG. 5. Reduction unit 202 is generally similar to reduction unit 152 except that second planet carrier 94 is now fixed for non-rotation to housing 50 and second ring gear 92 is now the driven output which is connected to third ring gear 116. In particular, a brake plate 204 is shown connecting second carrier ring 102 to housing 50 while an axial sleeve 206 is shown drivingly coupling second ring gear 92 to third ring gear 116. A brake plate 208 is shown to schematically indicate that first planet carrier 78 is still fixed to housing 50.

Figure 7:
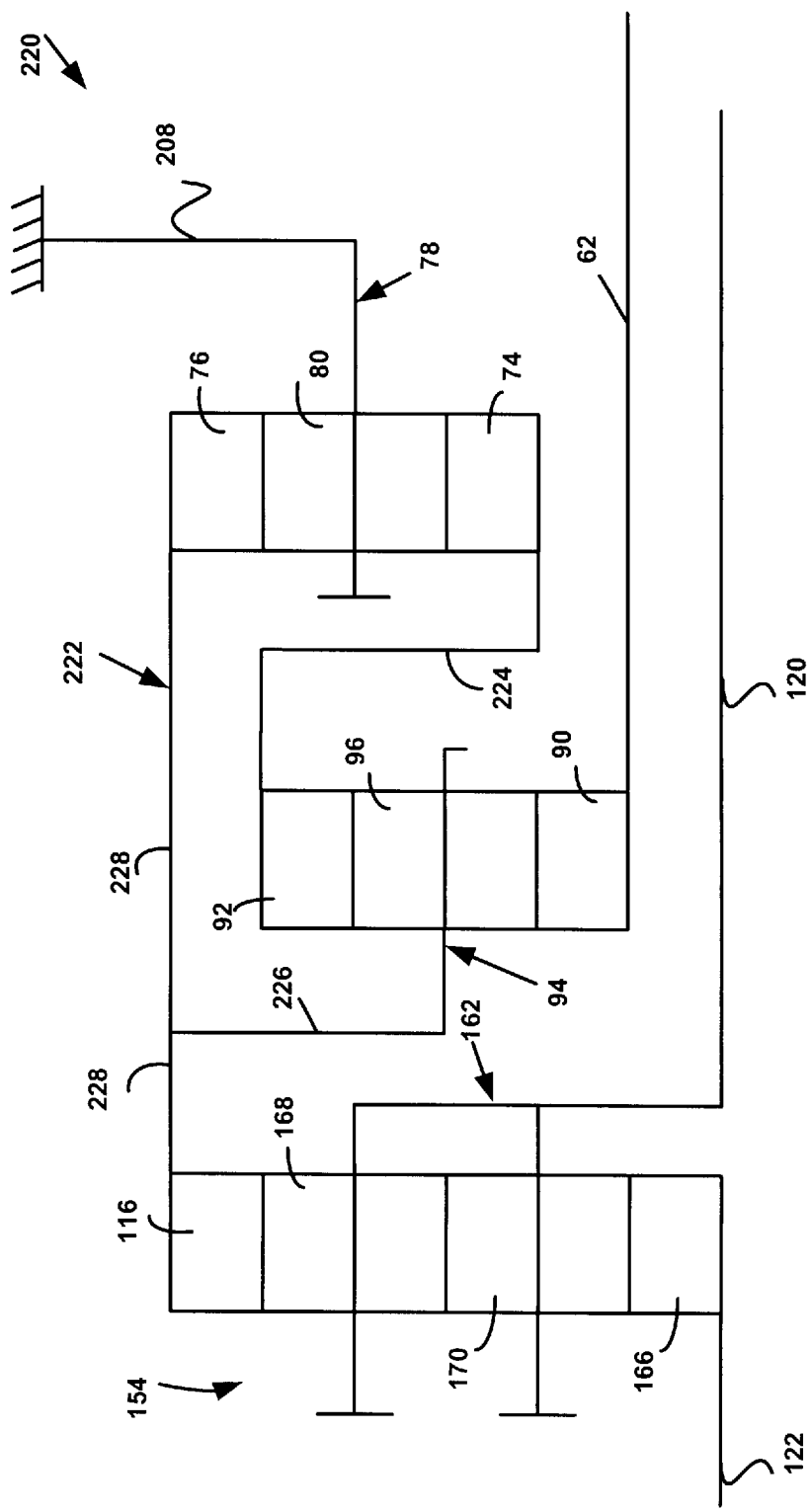
FIG. 7 is a schematic of a further alternative embodiment for a gearbox adapted for use in the electric drive motor axle.

Referring now to FIG. 7, a schematic illustration is provided for yet another alternative construction for a gearbox 220 adapted for use with EDMA 32. Gearbox 220 includes a modified reduction unit 222 which drives assembly 154 of FIG. 5. Reduction unit 222 shows rotor shaft 62 driving second sun gear 90, second ring gear 92 driving first sun gear 74 via a drive plate 224, and first ring gear 76 driving third ring gear 116. Second planet carrier 94 is shown to also be drivingly connected to third ring gear 116 via a drive plate 226. A tubular drive shaft 228 is shown to connect first ring gear 76 and second planet carrier 94 to third ring gear 116.

As noted, the hybrid powertrain system of the present invention includes two drive power sources, namely engine 16 and motor assembly 58 of EDMA 32. Power from engine 16 is transmitted to transmission 18 (or transaxle 18A) which can be of any known type (i.e., automatic, manual, automated manual, CVT, etc.) having a forward-reverse mechanism and a gearshift mechanism. Motor assembly 58 of EDMA 32 is connected to a battery 250 and can be selectively shifted into any of a DRIVE state, a CHARGING state, and a NO-LOAD state by an electronic control system 252. In the DRIVE state, EDMA 32 functions as a motor-driven gearbox that is driven by electrical energy drawn from battery 250. In the CHARGING state, EDMA 32 functions as an electric generator for storing electric energy in battery 200. In the NO-LOAD state, motor assembly 58 is off and rotor shaft 62 is permitted to rotate freely relative to stator 60.

Figure 8:
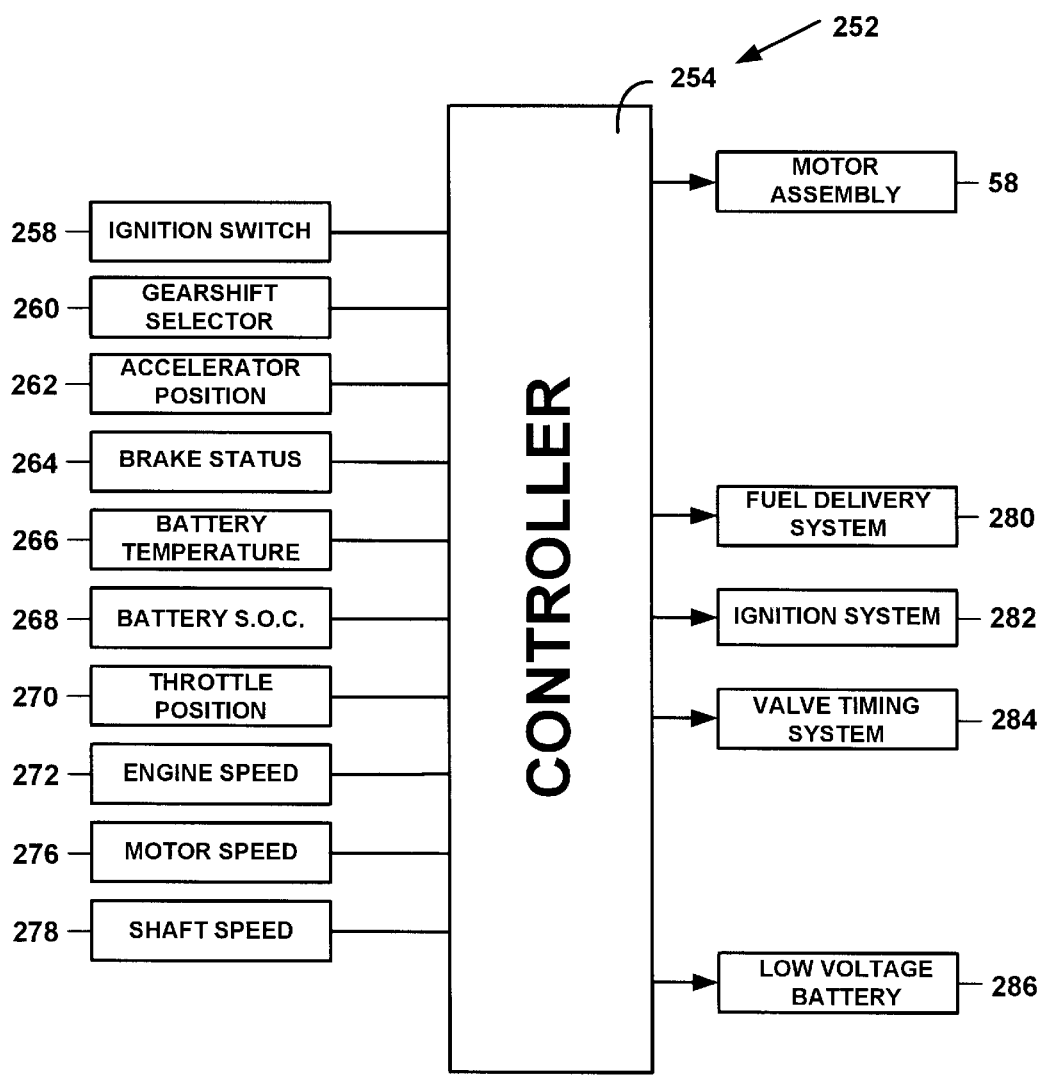
FIG. 8 is a schematic diagram of an exemplary control system associated with the hybrid powertrains of the present invention.

Control system 252 is provided for controlling operation of the hybrid powertrains shown in FIGS. 1 and 2. Referring to FIG. 8, control system 252 includes a controller 254 adapted to receive input signals from various sensors and input devices cumulatively identified in FIGS. 1 and 2 as vehicle sensors 256. Controller 254 is schematically shown in block format to be representative of an arrangement having an engine control section, a motor control sections, and a traction control section. Controller 254 is principally comprised of a microcomputer having a central processing unit (CPU), random-access memory (RAM), read-only memory (ROM), and an input-output actuator interface. Controller 254 performs data processing operations to execute various control routines according to control programs and/or maps stored in the ROM. Controller 254 receives data from an ignition switch 258, a gearshift lever switch 260, an accelerator position sensor 262, a brake status switch 264, a battery temperature sensor 266, a battery SOC (state of charge) sensor 268, and a throttle position sensor 270. In addition, other inputs include an engine speed sensor 272, a motor speed sensor 276, and a driveshaft speed sensor 278. Ignition switch 258 is closed when the vehicle key is turned on. Assuming transmission 18 is of an automatic type, then "P", "N", "R", and "D" switches in gearshift selector switch 260 are closed when the gearshift mechanism is located in its Park (P), Neutral (N), Reverse (R) and Drive (D) positions, respectively. Accelerator position sensor 262 senses the depression angle of an accelerator pedal. Brake status switch 264 is turned on when the brake pedal is depressed. Battery temperature 266 senses the temperature of battery 250. Battery SOC sensor 268 senses the charge level of battery 250. Throttle position sensor 270 senses the degree of opening of the engine throttle valve. Engine speed sensor 272 senses a parameter indicative of the rotary speed of the drive shaft of engine 16. Motor speed sensor 276 senses a parameter indicative of the rotary speed of rotor 62 of motor assembly 58. Shaft speed sensor 278 senses the rotary speed of propshaft 20 and can further be used as an indication of vehicle speed.

Based on the operating information inputted to controller 254, a mode of operation of the hybrid powertrain is selected and controller 254 sends electric control signals to various power-operated control devices. Specifically, controller 254 monitors and continuously controls actuation of motor assembly 58 of EDMA 32 and various engine management systems for controlling the speed and torque generated by engine 16. These engine management systems include a fuel delivery system 280, an ignition system 282, and a valve timing system 286. A low voltage battery 286 may serve as the power supply for controller 254.

There are four modes of operation for vehicle 10, namely: (a) an electric mode; (b) a hybrid; (c) an engine mode; and (d) a regenerative mode. In the electric mode, only motor assembly 58 provides motive power to vehicle 10. In the hybrid mode, both engine 16 and motor assembly 58 provide motive power to vehicle 10. In the engine mode, only engine 16 provides motive power to vehicle 10. In the regenerative mode, a portion of the engine power is absorbed by motor assembly 58 to charge battery 250. The transition from one mode to the next is smooth and transparent to the vehicle operator since controller 254 selects the most appropriate mode depending on various vehicle operating conditions including vehicle speed, accelerator demand and battery charge status.

In the electric mode, motor assembly 58 is shifted into its DRIVE state such that motive power is generated by EDMA 32. When shifting from the electric mode into the hybrid mode, engine 16 is started and provides motive power in conjunction with EDMA 32 to establish four-wheel drive operation. When the vehicle's operating conditions warrant operation in the engine only mode, motor assembly 58 is shifted into one of its CHARGING or NO-LOAD states. Thus, a four-wheel drive mode of operation is established when both powered drivelines are actuated and controlled. The traction control section of controller 254 is operable to control slip conditions between the front and rear wheels.

Preferred embodiments of the invention has been disclosed to provide those skilled in the art an understanding of the best mode currently contemplated for the operation and construction of the hybrid drive systems. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle for a motor vehicle, comprising:
   an electric motor;
   a reduction unit having first and second gearsets, said first gearset including a first input member driven by said electric motor for driving a first output member at a reduced speed relative to said first input member, said second gearset including a second input member driven by said first output member for driving a second output member at a reduced speed relative to said second input member; and
   a differential assembly having an input driven by said second output member, a first differential output driving a first output shaft, and a second differential output driving a second output shaft.

2. The drive axle of claim 1 wherein said first gearset includes a first sun gear defining said first input member, a first ring gear defining said first output member, a first carrier fixed against rotation, and first planet gears rotatably supported by said first carrier and meshed with said first ring gear and said first sun gear.

3. The drive axle of claim 2 wherein said second gearset includes a second sun gear driven by said first ring gear and defining said second input member, a second ring gear fixed against rotation, a second carrier defining said second output member, and second planet gears rotatable supported by said second carrier and meshed with said second sun gear and second ring gear.

4. The drive axle of claim 3 wherein said differential assembly is a third gearset having a third ring gear driven by said second carrier, a third sun gear driving said first output shaft, a third carrier driving said second output shaft, third planet gears rotatably supported by said third carrier and meshed with said third ring gear, and fourth planet gears rotatably supported by said third carrier and meshed with said third sun gear and said third planet gears.

5. The drive axle of claim 3 wherein said differential assembly is a third gearset having a third ring gear driving said first output shaft, a third sun gear driving said second output shaft, and third planet gears rotatably supported from said second carrier and meshed with said third ring gear and said third sun gear.

6. The drive axle of claim 2 wherein said second gearset includes a second sun gear driven by said first ring gear, a second ring gear driving said input of said differential assembly, a second carrier fixed against rotation, and second planet gears rotatably supported by said second carrier and meshed with said second sun gear and said second ring gear.

7. The drive axle of claim 6 wherein said differential assembly is a third gearset having a third ring gear driven by said second ring gear, a third sun driving said first output shaft, a third carrier driving said second output shaft, third planet gears rotatably supported by said third carrier and meshed with said third ring gear, and fourth planet gears rotatably supported by said third carrier and meshed with said third planet gears and said third sun gear.

8. The drive axle of claim 1 wherein said first and second output shafts are adapted for connection to a pair of wheels to deliver drive torque thereto in response to actuation of said electric motor.

9. The drive axle of claim 1 further comprising:
   a vehicle sensor for detecting an operating characteristic of the motor vehicle and generating sensor signals; and
   a controller for generating electrical control signals in response to said sensor signals, said control signals being delivered to said electric motor for controlling the rotary speed of said first input member.

10. A drive axle for driving a pair of wheels in a motor vehicle comprising:
    first and second output shafts adapted for connection to the pair of wheels;
    a reduction unit including a first sun gear, a first ring gear, a first carrier fixed against rotation, a set of first planet gears rotatably supported from said first carrier and meshed with said first sun gear and said first ring gear, a second sun gear coupled to said first ring gear, a second ring gear, a second carrier fixed against rotation, and a set of second planet gears rotatably supported for said second carrier and meshed with said second sun gear and said second ring gear;
    a differential assembly having an input driven by said second ring gear, a first output coupled to said first output shaft, and a second output coupled to said second output shaft; and
    an electric motor for driving said first sun gear.

11. The drive axle of claim 10 said differential assembly is a third gearset having a third ring gear coupled to said second ring gear, a third sun gear coupled to said first output shaft, a third carrier coupled to said second output shaft, a set of third planet gears rotatably supported by said third carrier and meshed with said third ring gear, and a set of fourth planet gears rotatably supported by said third carrier and meshed with said third sun gear and said third planet gears.

12. The drive axle of claim 10 further comprising:
   a vehicle sensor for detecting an operating characteristic of the motor vehicle and generating sensor signals; and
   a controller for generating electrical control signals in response to said sensor signals, said control signals being delivered to said electric motor for controlling the rotary speed of said first sun gear.

13. A drive axle for driving a pair of wheels in a motor vehicle comprising:
   first and second output shafts adapted for connection to the pair of wheels;
   a reduction unit including a first sun gear, a first ring gear, a first carrier fixed against rotation, first planet gears rotatably supported from said first carrier and meshed with said first sun gear and said first ring gear, a second sun gear, a second ring gear driving said first sun gear, a second carrier coupled to said first ring gear, and second planet gears rotatably supported from said second carrier and meshed with said second sun gear and said second ring gear;
   a differential assembly having an input driven by said first ring gear, a first output driving said first output shaft, and a second output driving said second output shaft; and
   an electric motor for driving said second sun gear.

14. The drive axle of claim 13 wherein said differential assembly includes a third ring gear driven by said first ring gear, a third sun gear driving said first output shaft, a third carrier driving said second output shaft, third planet gears rotatably supported by said third carrier and meshed with said third ring gear, and fourth planet gears rotatably supported by said third carrier and meshed with said third sun gear and said third planet gears.

15. The drive axle of claim 13 further comprising:
   a vehicle sensor for detecting an operating characteristic of the motor vehicle and generating sensor signals; and
   a controller for generating electrical control signals in response to said sensor signals, said control signals being delivered to said electric motor for controlling the rotary speed of said second sun gear.

16. A hybrid motor vehicle, comprising:
   a first powered driveline including an engine operable for driving a first pair of wheels; and
   a second powered driveline including a drive axle operable for driving a second pair of wheels, said drive axle including an electric motor, a reduction unit having first and second gearsets, said first gearset including a first input member driven by said electric motor for driving a first output member at a reduced speed relative to said first input member, said second gearset including a second input member driven by said first output member for driving a second output member at a reduced speed relative to said second input member, and a differential assembly having an input driven by said second output member, a first differential output driving a first output shaft, and a second differential output driving a second output, said first and second output shafts driving said second pair of wheels.

17. The hybrid motor vehicle of claim 16 wherein said first gearset of said reduction unit in said drive axle includes a first sun gear defining said first input member, a first ring gear defining said first output member, a first carrier fixed against rotation, and a set of first planet gears rotatably supported by said first carrier and meshed with said first ring gear and said first sun gear.

18. The hybrid motor vehicle of claim 17 wherein said second gearset of said reduction unit includes a second sun gear driven by said first ring gear and defining said second input member, a second ring gear fixed against rotation, a second carrier defining said second output member, and a set of second planet gears rotatable supported by said second carrier and meshed with said second sun gear and second ring gear.

19. The hybrid motor vehicle of claim 19 wherein said differential assembly is a third gearset having a third ring gear driven by said second carrier, a third sun gear driving said first output shaft, a third carrier driving said second output shaft, a set of third planet gears rotatably supported by said third carrier and meshed with said third ring gear, and a set of fourth planet gears rotatably supported by said third carrier and meshed with said third sun gear and said third planet gears.

20. The hybrid motor vehicle of claim 18 wherein said differential assembly is a third gearset having a third ring gear driving said first output shaft, a third sun gear driving said second output shaft, and a set of third planet gears rotatably supported from said second carrier and meshed with said third ring gear and said third sun gear.

21. The hybrid motor vehicle of claim 16 further comprising:
   vehicle sensors for detecting operating characteristics of the motor vehicle and generating sensor signals; and
   a controller for generating electrical control signals in response to said sensor signals, said control signals being delivered to said electric motor for controlling the rotary speed of said first input member.

22. A hybrid motor vehicle, comprising:
   a first powered driveline including an engine operable for driving a first pair of wheels; and
   a second powered driveline including a drive axle operable for driving a second pair of wheels, said drive axle including an electric motor, a reduction unit including a first sun gear driven by said electric motor, a first ring gear, a first carrier fixed to against rotation, first planet gears rotatably supported from said first carrier and meshed with said first sun gear and said first ring gear, a second sun gear driven by said first ring gear, a second ring gear, a second carrier fixed against rotation, and second planet gears rotatably supported by said second carrier and meshed with said second sun gear and said second ring gear, and a differential assembly having an input driven by said second ring gear, a first output driving a first output shaft, and a second output driving a second output shaft, said first and second output shafts coupled to said second pair of wheels.

23. The hybrid motor vehicle of claim 22 wherein said differential assembly includes a third ring gear driven by said second ring gear, a third sun gear driving said first output shaft, a third carrier driving said second output shaft, third planet gears rotatably supported by said third carrier and meshed with said third ring gear, and fourth planet gears rotatably supported by said third carrier and meshed with said third sun gear and said third planet gears.

24. The hybrid motor vehicle of claim 22 further comprising:
   vehicle sensors for detecting operating characteristics of the motor vehicle and generating sensor signals; and a controller for generating electrical control signals in response to said sensor signals, said control signals being delivered to said electric motor for controlling the rotary speed of said first sun gear.

25. A hybrid motor vehicle, comprising:

a first powered driveline including an engine operable for driving a first pair of wheels; and a second powered driveline including a drive axle operable for driving a second pair of wheels, said drive axle including, an electric motor, a reduction unit including a first sun gear, a first ring gear, a first carrier fixed against rotation, first planet gears rotatably supported from said first carrier and meshed with said first sun gear and said first ring gear, a second sun gear driven by said electric motor, a second ring gear driving said first sun gear, a second carrier coupled to said first ring gear, second planet gears rotatably supported for said second carrier and meshed with said second sun gear and said second ring gear, and a differential assembly having an input driven by said first ring gear, a first output driving a first output shaft, and a second output driving a second output shaft, and said first and second output shafts are operably connected to said second set of wheels.

26. The hybrid motor vehicle of claim 25 wherein said differential assembly includes a third ring gear driven by said first ring gear, a third sun gear driving said first output shaft, a third carrier driving said second output shaft, third planet gears rotatably supported by said third carrier and meshed with said third ring gear, and fourth planet gears rotatably supported by said third carrier and meshed with said third sun gear and said third planet gears.

27. The hybrid motor vehicle of claim 25 further comprising:

vehicle sensors for detecting operating characteristics of the motor vehicle and generating sensor signals; and a controller for generating electrical control signals in response to said sensor signals, said control signals being delivered to said electric motor for controlling the rotary speed of said second sun gear.

* * * * *